United States Patent
Shin

(10) Patent No.: US 9,015,634 B2
(45) Date of Patent: Apr. 21, 2015

(54) METHOD FOR DISPLAYING MENU

(75) Inventor: Hee Su Shin, Yongin-si (KR)

(73) Assignee: Intellectual Discovery Co., Ltd., Seoul (KR)

(*) Notice: Subject to any disclaimer, the term of this patent is extended or adjusted under 35 U.S.C. 154(b) by 23 days.

(21) Appl. No.: 12/513,878

(22) PCT Filed: Sep. 20, 2007

(86) PCT No.: PCT/KR2007/004618
§ 371 (c)(1),
(2), (4) Date: May 7, 2009

(87) PCT Pub. No.: WO2008/056883
PCT Pub. Date: May 15, 2008

(65) Prior Publication Data
US 2010/0050121 A1    Feb. 25, 2010

(30) Foreign Application Priority Data
Nov. 8, 2006    (KR) .................. 10-2006-0109984

(51) Int. Cl.
*G06F 3/033* (2013.01)
*G06F 3/0482* (2013.01)

(52) U.S. Cl.
CPC .................. *G06F 3/0482* (2013.01)

(58) Field of Classification Search
CPC ................................................ G06F 3/0482
USPC ....................................................... 715/853
See application file for complete search history.

(56) References Cited

U.S. PATENT DOCUMENTS

| | | | | |
|---|---|---|---|---|
| 5,956,035 A | * | 9/1999 | Sciammarella et al. | 715/815 |
| 6,108,631 A | * | 8/2000 | Ruhl | 704/270 |
| 6,384,827 B1 | * | 5/2002 | Dawkins | 345/467 |
| 6,452,597 B1 | * | 9/2002 | Goldberg et al. | 345/472 |
| 6,469,719 B1 | * | 10/2002 | Kino et al. | 715/810 |
| 6,591,168 B2 | | 7/2003 | Odinak et al. | |
| 6,865,404 B1 | * | 3/2005 | Tikkala et al. | 455/566 |
| 6,865,713 B1 | * | 3/2005 | Bates et al. | 715/233 |
| 7,503,001 B1 | * | 3/2009 | Lekutai | 715/261 |
| 2003/0222923 A1 | * | 12/2003 | Li | 345/815 |
| 2004/0160463 A1 | * | 8/2004 | Battles et al. | 345/814 |
| 2005/0203698 A1 | * | 9/2005 | Lee | 701/200 |
| 2007/0128899 A1 | * | 6/2007 | Mayer | 439/152 |
| 2008/0055284 A1 | * | 3/2008 | Zinn | 345/204 |
| 2008/0320396 A1 | * | 12/2008 | Mizrachi et al. | 715/744 |

FOREIGN PATENT DOCUMENTS

KR    10-2005-0096437    10/2005
KR    10-2006-0106515    10/2006

OTHER PUBLICATIONS

International Search Report for PCT/KR2007/004618 mailed Jan. 2, 2008.
Written Opinion for PCT/KR2007/004618 mailed Jan. 2, 2008.

* cited by examiner

*Primary Examiner* — William Bashore
*Assistant Examiner* — Henry Orr
(74) *Attorney, Agent, or Firm* — Fox Rothschild, LLP

(57) ABSTRACT

A method of displaying a menu which displays at least one item selected by a user from a menu including a plurality of items is provided. A method of displaying a menu, including: displaying the menu including a plurality of items to a user; receiving a selection of at least one of the plurality of items from the user; and reducing a font size of a string of the selected at least one item, and displaying the string.

4 Claims, 9 Drawing Sheets

METHOD FOR DISPLAYING MENU

This application is the U.S. national phase of International Application No. PCT/KR2007/004618 filed 20 Sep. 2007 which designated the U.S. and claims priority to Korean Patent Application No. 10-2006-0109984 filed 8 Nov. 2006, the entire contents of each of which are hereby incorporated by reference.

TECHNICAL FIELD

The present invention relates to a method of displaying a menu, and more particularly, to a method of displaying a menu which displays at least one item selected by a user from a menu including a plurality of items.

BACKGROUND ART

In a conventional art, when a user selects an arbitrary item from a menu which includes a plurality of items, the selected item is displayed in a various ways. For example, the text of the selected item is displayed in bold text or in different colored font. In some cases, the background color and text color of the selected item are reversed so that the selected item is differentiated from the other items of the menu. In Korean Patent Registration No. 10-0619900, when an item of a menu is selected by a user, the RBG color value of the item is shifted to a predetermined color value so that the color of the selected item becomes dark.

Also, in a menu including a plurality of items within an image display range having a limit on the number of displayed characters, when a string in a line exceeds the limit on the number of displayed characters, the excess portion of the string is displayed as " . . . " to show the string is not fully displayed.

FIG. 1 is a diagram illustrating an example of a screen displaying a menu in a navigation system 100 in a conventional art.

A user inputs "Gang" in a keyword input unit 110 of the navigation system 100, and a search result is displayed in a menu display unit 120. As illustrated in FIG. 1, a string of an item, "Gang-ga-ne cheek meat/Incheon Seo-gu . . . ", which is selected by the user and represented in a different background color, is actually to be displayed as "Gang-ga-ne cheek meat/ Incheon Seo-gu Seoknam 3 11". However, a portion exceeding a display range is displayed as " . . . " due to a limit of screen size. Although an item below the selected item is actually "Gang-ga-ne cheek meat/Incheon Seo-gu Seoknam 5 22", the item is displayed as "Gang-ga-ne cheek meat/ Incheon Seo-gu . . . " due to the limit of screen size. As described above, in the conventional art, a selected menu item is displayed using a reverse, and the like. However, when a string included in the selected menu is not fully displayed, the user may not exactly determine which item is the item that the user desires to retrieve, using only strings of currently displayed items.

DISCLOSURE OF INVENTION

Technical Goals

The present invention provides a method of displaying a menu which reduces a font size of a string when a user selects at least one item, to display a greater number of characters within a limited image display range, and thereby may enable the user to determine whether the selected item is correct.

The present invention also provides a method of displaying a menu which may maintain a font size which can be discerned by a user, and display as much of a string as possible.

The present invention also provides a method of displaying a menu which, when a string of at least one item selected by a user is not fully displayed in one line, displays the string in at least two lines, and thereby may display as much of the string included in a menu item as possible.

Technical Solutions

According to an aspect of the present invention, there is provided a method of displaying a menu, including: displaying the menu including a plurality of items to a user; receiving a selection on at least one of the plurality of items from the user; and reducing a font size of a string of the selected at least one item, and displaying the string.

According to another aspect of the present invention, there is provided a method of displaying a menu, including: displaying the menu including a plurality of items to a user; receiving a selection on at least one of the plurality of items from the user; and displaying a string in at least two lines, when the string of the selected at least one item is not fully displayed in one line.

BEST MODE FOR CARRYING OUT THE INVENTION

Hereinafter, embodiments of the present invention are described in detail by referring to the figures. However, the present invention is not limited to the embodiments of the present invention.

Figure 1:
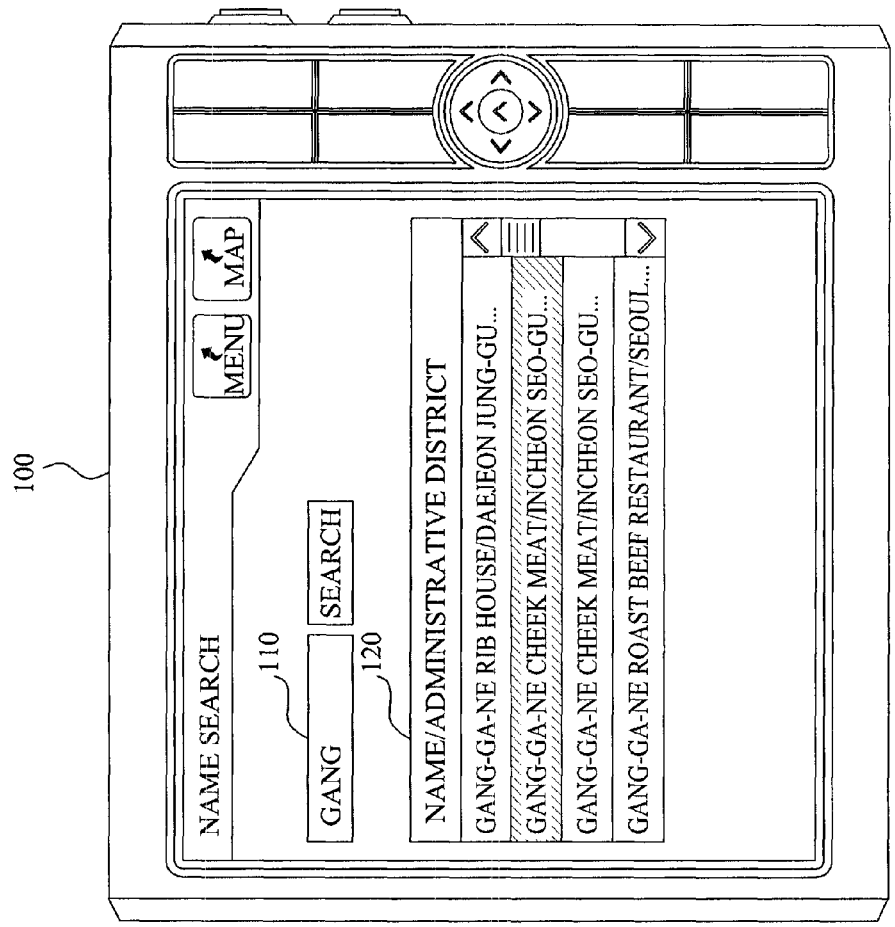
FIG. 1 is a diagram illustrating an example of a screen displaying a menu in a navigation system 100 in a conventional art.
Figure 2:
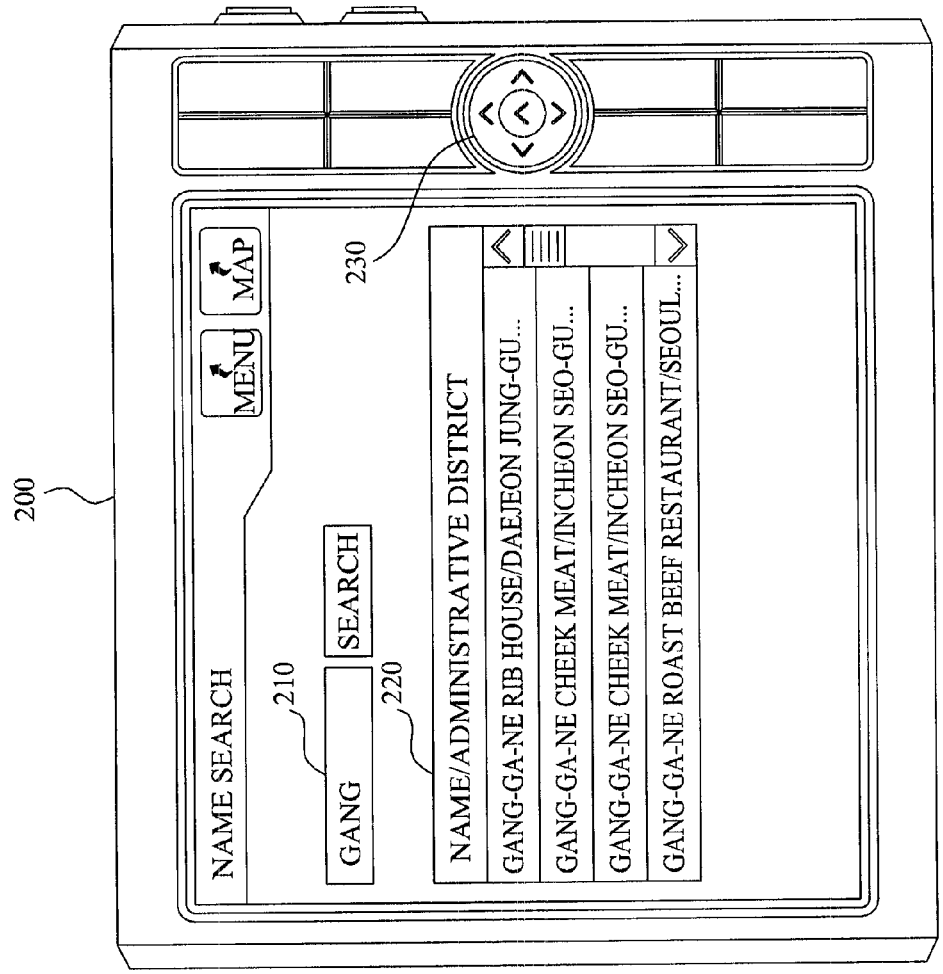
FIG. 2 is a diagram illustrating a menu including a plurality of items in a navigation system according to an embodiment of the present invention.

FIG. 2 is a diagram illustrating a menu including a plurality of items in a navigation system according to an embodiment of the present invention.

The navigation system 200 includes a keyword input unit 210, a menu display unit 220, and a direction key 230. The keyword input unit 210 receives a selection on a keyword for searching a starting location, a destination, or an intermediate point from a user. The menu display unit 220 displays a plurality of items which is retrieved according to the keyword inputted via the keyword input unit 210. In this instance, a top item may be displayed as selected as a default. The direction key 230 is a tool for selecting at least one item from a plurality of items of a menu and inputting the selected at least one item desired to be retrieved.

Figure 3:
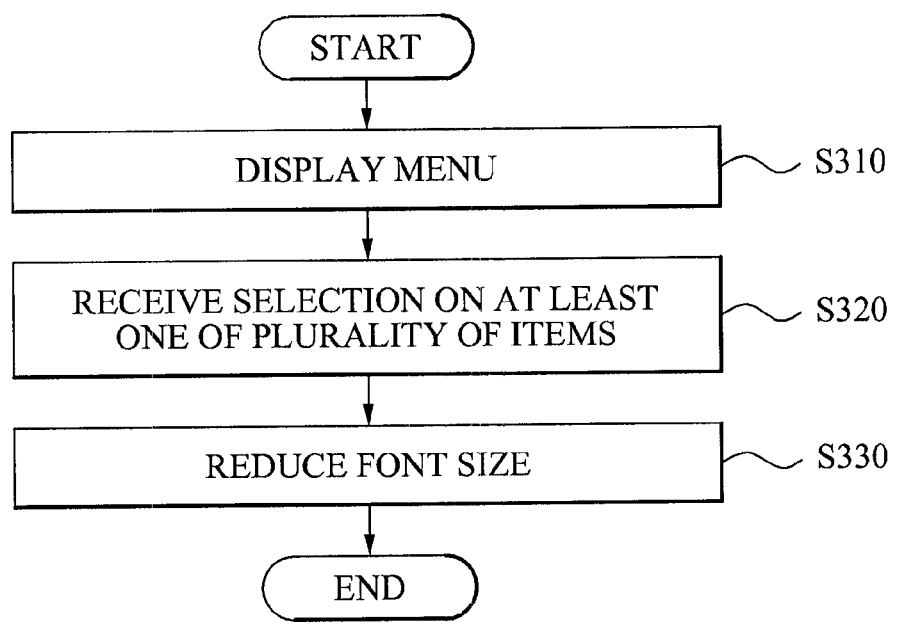
FIG. 3 is a flowchart illustrating a method of displaying a menu which reduces a font size of a string of a selected item in a navigation system according to an embodiment of the present invention.

FIG. 3 is a flowchart illustrating a method of displaying a menu which reduces a font size of a string of a selected item in a navigation system according to an embodiment of the present invention.

In operation S310, a menu display unit 220 of the navigation system 200 displays a menu including a plurality of items to a user. The menu including the plurality of items is retrieved according to a keyword inputted by a keyword input unit 210.

Referring to FIG. 2, the user inputs a keyword "Gang" in the keyword input unit 210, and the retrieved plurality of items such as "Gang-ga-ne rib house/Daejeon Jung-gu . . . ", "Gang-ga-ne cheek meat/Incheon Seo-gu . . . ", and "Gang-ga-ne roast beef restaurant/Seoul . . . " corresponding to the keyword is displayed in the menu display unit 220. In this instance, since strings of each item exceed a limit on a number of displayed characters of an image display range of the navigation system 200, the excess portion of the strings are replaced with " . . . ". Accordingly, in "Gang-ga-ne cheek meat/Incheon Seo-gu . . . " displayed twice in FIG. 2, omitted portions of the strings are different from each other.

Figure 4:
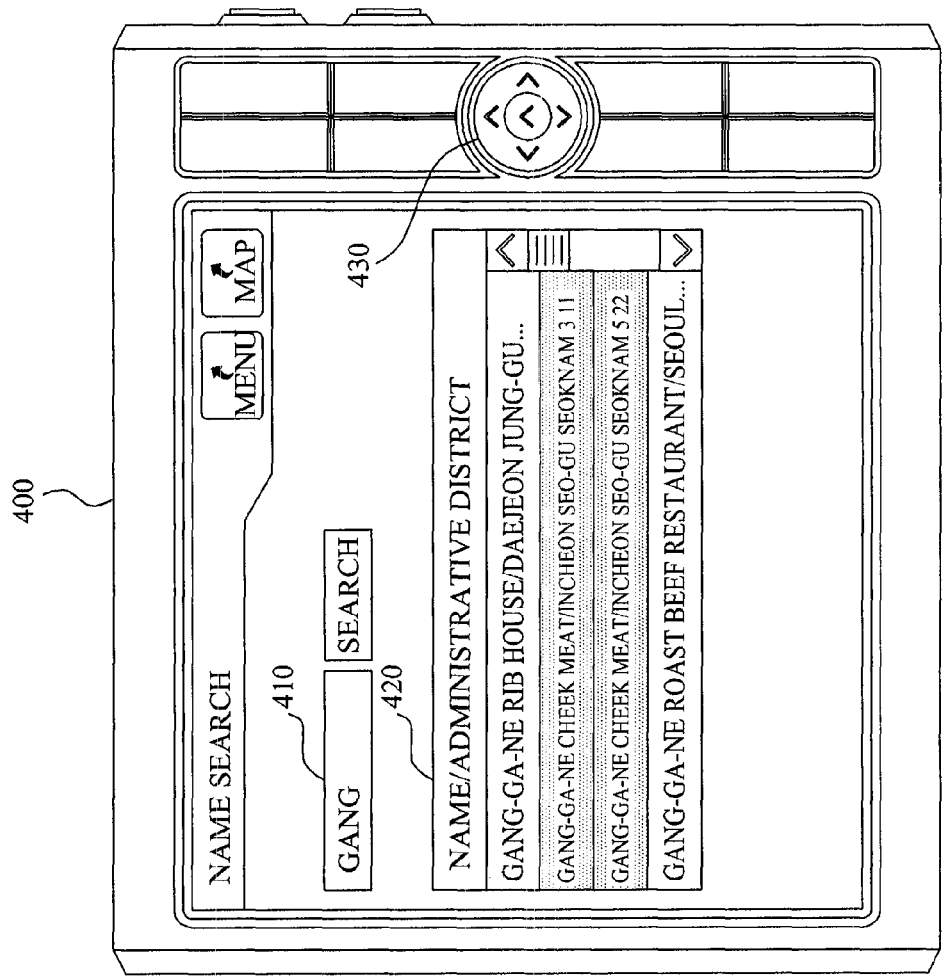
FIG. 4 is a diagram illustrating an example of reducing a font size of a selected string in a navigation system according to an embodiment of the present invention.

In operation S320, the navigation system 200 receives a selection on at least one of the plurality of items of the displayed menu from the user. The user may select at least one or two items among the plurality of items displayed on the menu display unit 220 by operating the direction key 230 of the navigation system 200. A screen displaying that two items of "Gang-ga-ne cheek meat/Incheon Seo-gu . . . " in FIG. 2 are selected by operating the direction key 230 by the user is illustrated in FIG. 4. In this instance, the two items of "Gang-ga-ne cheek meat/Incheon Seo-gu . . . " are difficult to distinguish since an end portion of the strings are omitted. A selected item may change every time the direction key 230 is operated, or an item which is selected when the user pushes a separate selection button after operating the direction key 230 may be set to be a selected item.

In operation S330, the menu display unit 220 of the navigation system 200 reduces a font size of a string of the selected at least one item, and displays the string. For example, when two items are selected in operation S320, the strings of the two items, "Gang-ga-ne cheek meat/Incheon Seo-gu . . . ", selected by the user, are displayed after reducing a font size of the string.

FIG. 4 is a diagram illustrating an example of reducing a font size of a selected string in a navigation system according to an embodiment of the present invention.

In the navigation system 400 of FIG. 4, a user inputs a keyword "Gang" in a keyword input unit 410. A plurality of items of a menu is displayed on a menu display unit 420, the user selects one or more items from among the plurality of items of the menu using a direction key 430. In FIG. 4, the selected item, "Gang-ga-ne cheek meat/Incheon Seo-gu Seoknam 3 11" and "Gang-ga-ne cheek meat/Incheon Seo-gu Seoknam 5 22", are illustrated as an example. In this instance, a font size of strings of each of the selected items is reduced. As illustrated in FIG. 4, since the font size of strings of each of the selected items is reduced, more of the strings may be displayed. Also, the user may check an accurate content of each item and select "Gang-ga-ne cheek meat/Incheon Seo-gu Seoknam 3 11" as a stating location, a destination, or an intermediate point in a menu.

When the user selects the two items, that is, "Gang-ga-ne cheek meat/Incheon Seo-gu Seoknam 3 11" and "Gang-ga-ne cheek meat/Incheon Seo-gu Seoknam 5 22", reducing of the font size of the strings of each item indicates that the font size of the string of the selected at least one item is smaller than that of a string of an unselected item such as "Gang-ga-ne rib house/Daejeon Jung-gu . . . " and "Gang-ga-ne roast beef restaurant/Seoul . . . ".

However, when the font size of the string of the selected at least one item is reduced to be so small the user may not read, the user may not discern a content of the string or divide each item.

Accordingly, the font size of the string of the selected at least one item which is smaller than that of the string of the unselected item indicates designating a minimum font size which is readable by the user, that is, a threshold font size, not limitlessly reducing a size of the string and displaying the string in the menu screen. Accordingly, a limit for the font size of the string of the selected at least one item, set to be equal to or greater than the threshold font size, exists, and the font size of the string of the selected at least one item is set to display as much of the string as possible within the limit range. That is, according to an embodiment of the present invention, the font size of the string of the selected at least one item is set to be equal to or greater than a predetermined threshold font size and set to display as much of the string as possible. For example, in an environment where the a threshold font size is 5, when an entire string of a corresponding item may be displayed even when a font size is set as 8, a font size of the corresponding item is set as 8 and the string of the corresponding item may be displayed. Also, in an environment where the a threshold font size is 5, when an entire string of a corresponding item may not be displayed even when a font size is set as 5, the font size is not reduced any further, is set as 5, and a string of a selected item is displayed.

According to another embodiment of the present invention, when the user selects an item as described above, a reduced font size of a string may not vary within a threshold font, and may be predetermined. For example, a string of an unselected item is displayed as a font size of 10, and a string of a selected item is displayed as a font size of 8. The predetermined font size may vary in a system or through a menu screen environment setting by the user. According to the present embodiment, it is advantageous that a configuration is simple and more strings of the selected item may be displayed than the string of the unselected item.

Figure 5:
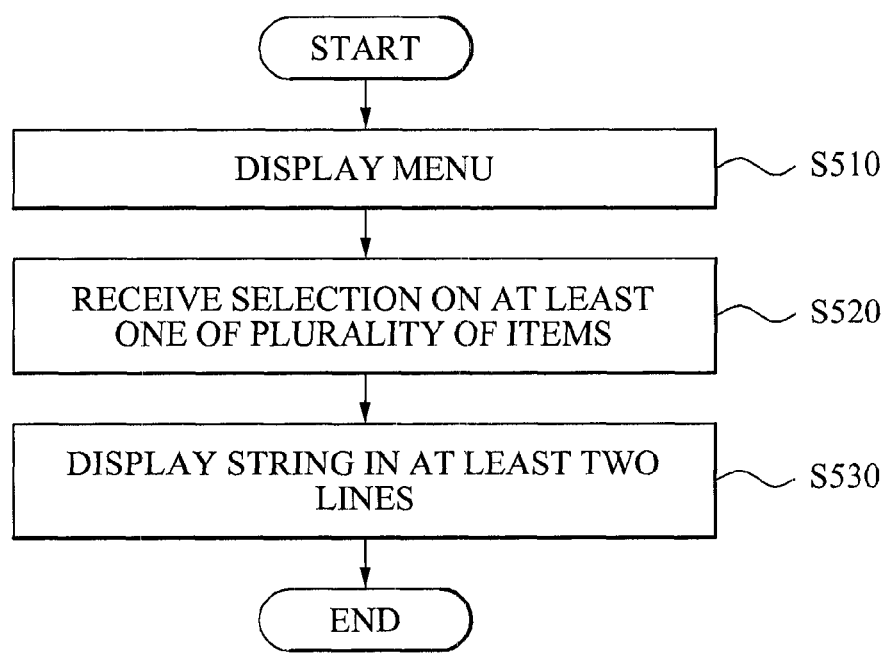
FIG. 5 is a flowchart illustrating a method of displaying a menu which displays a selected string in two lines in a navigation system according to an embodiment of the present invention.

FIG. 5 is a flowchart illustrating a method of displaying a menu which displays a selected string in two lines in a navigation system according to an embodiment of the present invention.

In operation S510, a menu display unit 220 of the navigation system 200 displays a menu including a plurality of items retrieved according to a keyword inputted in a keyword input unit 210.

Referring to FIG. 2, the user inputs a keyword "Gang" in the keyword input unit 210, and the plurality of items retrieved according to the keyword such as "Gang-ga-ne rib house/Daejeon Jung-gu . . . ", "Gang-ga-ne cheek meat/Incheon Seo-gu . . . ", and "Gang-ga-ne roast beef restaurant/

Seoul . . . " is displayed on the menu display unit 220. In this instance, since strings of each of the plurality of items exceeds a limit on a number of displayed characters of an image display range of the navigation system 200, the excess portion of string is replaced with ". . .". Accordingly, in "Gang-ga-ne cheek meat/Incheon Seo-gu . . . " displayed twice in FIG. 2, omitted portions of the strings are different from each other.

Figure 6:
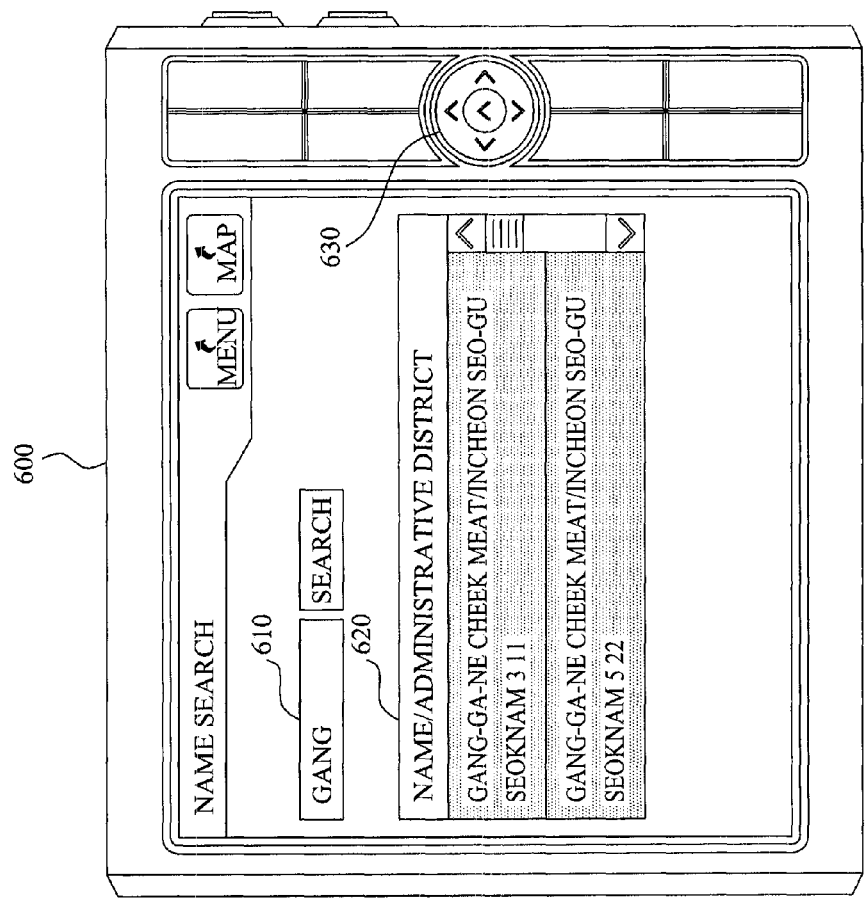
FIG. 6 is a diagram illustrating an example of displaying a selected string in two lines in a navigation system according to an embodiment of the present invention.

In operation S520, the navigation system 200 receives a selection on at least one of the plurality of items of the displayed menu from the user. The user may select at least one or two items by operating the direction key 230 of the navigation system 200 among the plurality of items displayed on the menu display unit 220. A screen displaying that two items of "Gang-ga-ne cheek meat/Incheon Seo-gu Seoknam . . . " in FIG. 2 are selected by operating the direction key 230 by the user is illustrated in FIG. 6. In this instance, the two items of "Gang-ga-ne cheek meat/Incheon Seo-gu . . . " are difficult to distinguish since an end portion of the string is omitted. A selected item may change every time the direction key 230 is operated, or an item which is selected when the user pushes a separate selection button after operating the direction key 230 may be set to be a selected item.

In operation S530, when an entire string of the selected at least one item is not fully displayed in one line, the menu display unit 220 of the navigation system 200 displays the string in at least two lines. For example, strings of the two items of "Gang-ga-ne cheek meat/Incheon Seo-gu Seoknam . . . " which are selected by the user in operation S520 are displayed in two lines, since the entire string is not fully displayed.

FIG. 6 is a diagram illustrating an example of displaying a selected string in two lines in a navigation system according to an embodiment of the present invention.

In the navigation system 600 of FIG. 6, a user inputs a keyword "Gang" in a keyword input unit 610. Then, a plurality of items of a menu is displayed on a menu display unit 620, and the user selects one or more items from the plurality of items of the menu using a direction key 630. In FIG. 6, "Gang-ga-ne cheek meat/Incheon Seo-gu Seoknam 3 11" is displayed as "Gang-ga-ne cheek meat/Incheon Seo-gu" in a first line and "Seoknam 3 11" in a second line. Also, in FIG. 6, "Gang-ga-ne cheek meat/Incheon Seo-gu Seoknam 5 22" is displayed as "Gang-ga-ne cheek meat/Incheon Seo-gu" in a first line and "Seoknam 5 22" in a second line. When a number of characters of a selected string is greater than a number of characters which may be displayed in a first line within a menu screen display range, the string may be divided into two lines as illustrated in FIG. 6, or when the selected string is longer than the menu screen display range, the string may be divided into at least two lines and displayed. Accordingly, more characters of an item may be displayed on the menu. Also, the user checking an accurate content of each of the plurality of items may exactly select "Gang-ga-ne cheek meat/Incheon Seo-gu Seoknam 3 11" on the menu.

Figure 7:
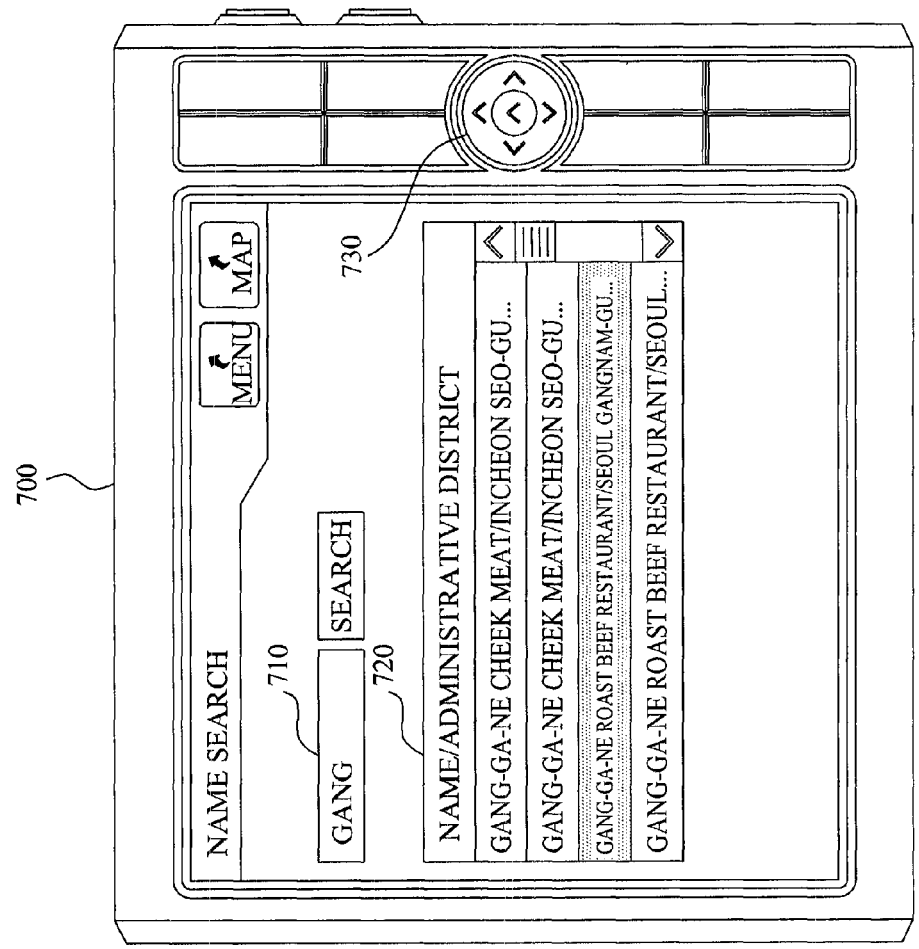
FIG. 7 is a diagram illustrating an example of a menu screen when a selected string is not fully displayed in a line although a font size of the selected string is reduced, in a navigation system according to an embodiment of the present invention.
Figure 8:
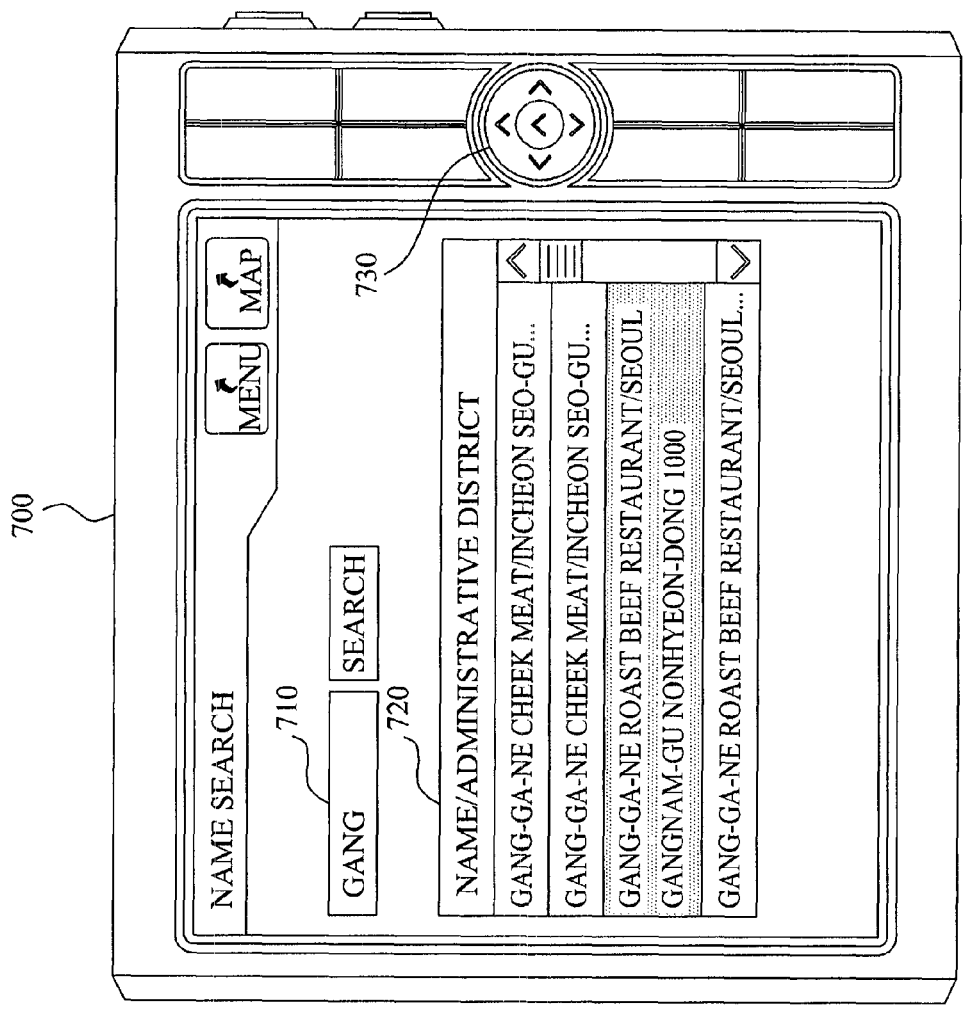
FIG. 8 is a diagram illustrating an example of displaying a selected string in two lines in a navigation system according to an embodiment of the present invention.
Figure 9:
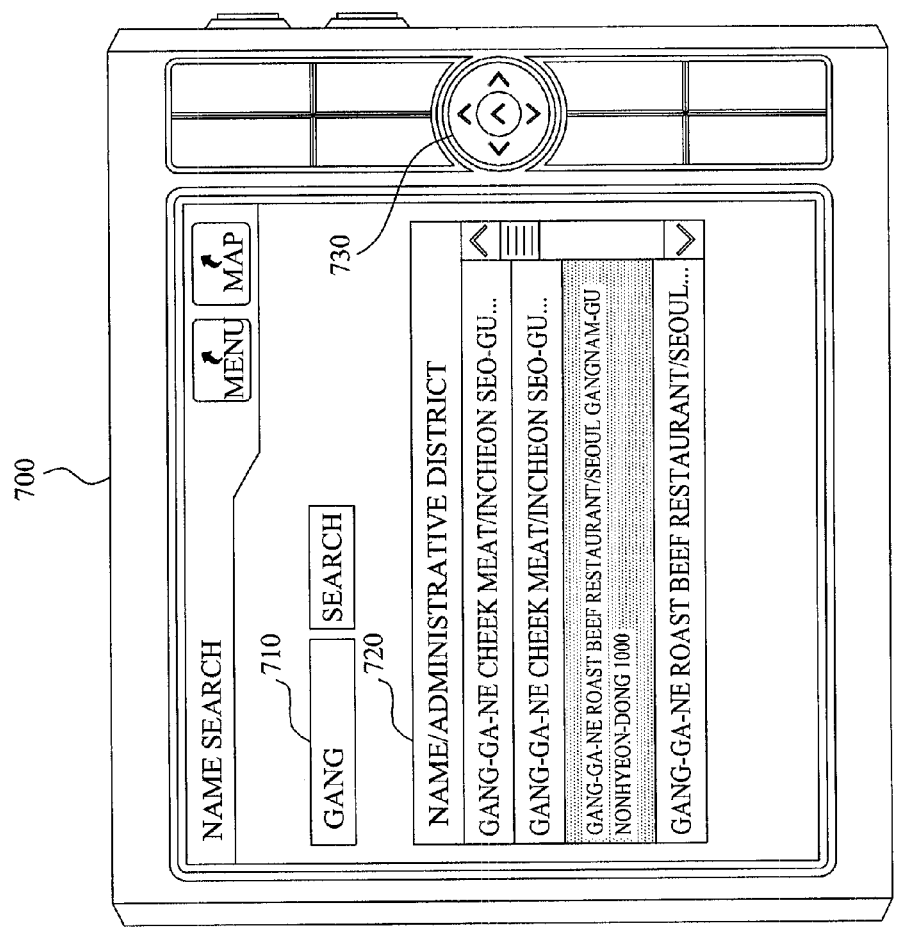
FIG. 9 is a diagram illustrating an example of reducing a font size of a selected string and displaying the selected string in two lines in a navigation system according to an embodiment of the present invention.

FIG. 7, FIG. 8, and FIG. 9 are diagrams illustrating a menu screen to which a method of reducing a font size of a selected string is applied, a menu screen to which a method of displaying a selected string, which may not be displayed in one line, in at least two lines, and a menu screen to which the above-described two methods are applied, in a navigation system according to an embodiment of the present invention.

In FIG. 7, a "Gang" is inputted in a keyword input unit 710 and a plurality of items retrieved is displayed on a menu display unit 720. When "Gang-ga-ne roast beef restaurant/ Seoul Gangnam-gu . . . " is selected using a direction key 730, the string of selected item exceeds a display character limit of the menu display unit 720 although a font size of the string is reduced as described above. Accordingly, a user may not exactly distinguish the selected item from a below item of "Gang-ga-ne roast beef restaurant/Seoul . . . ".

In FIG. 8, when the user selects an item of "Gang-ga-ne roast beef restaurant/Seoul Gangnam-gu Nonhyeon-dong 1000", the menu display unit 720 displays a string of the selected item in two lines as described above. When the string of the selected item is longer than the two lines illustrated in FIG. 8, the string may be displayed in a plurality of lines. However, when a selected item includes at least four lines, the menu display unit 720 where a number of lines which may be displayed is limited may not enable the user to compare and select. In FIG. 8, the menu display unit 720 may display up to four lines.

FIG. 9 is a diagram illustrating an example where a font size of a selected item of "Gang-ga-ne roast beef restaurant/ Seoul Gangnam-gu Nonhyeon-dong 1000" is reduced and displayed in two lines in order to enable a user to obtain accurate information about "Gang-ga-ne roast beef restaurant" on a menu screen.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although the present invention has been described in association with a navigation system, the present invention is not limited to the above-described embodiments. Also, the present invention may be applied to other types of environments where a menu screen is displayed such as Internet search portal, web program, application program, television, digital camera, portable terminal, and the like, which require an image screen.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, a method of displaying a menu reduces a font size of a string when a user selects at least one item, and thereby may display a greater number of characters within a limited image display range.

Also, according to the present invention, in a method of displaying a menu, a font size of a string of at least one item selected by a user is equal to or greater than a predetermined threshold font size, and the method of displaying a menu may display as much of the string as possible.

Also, according to the present invention, a method of displaying a menu, when a string of at least one item selected by a user is not fully displayed in one line, displays the string in at least two lines.

The invention claimed is:

1. A method of displaying a menu of a navigation system for implementation on a computer, comprising:
   receiving an input of a keyword associated with at least one of a starting location, a destination, and an intermediate point;
   retrieving a plurality of addresses corresponding to the keyword; displaying the menu including the plurality of addresses;
   receiving selections respectively from a user on at least two addresses of the plurality of addresses to concurrently select the at least two addresses such that remaining addresses of the plurality of addresses are unselected addresses of the plurality of addresses; and
   reducing a font size of strings of the concurrently selected at least two addresses to be smaller than the unselected addresses of the plurality of addresses when either one of the concurrently selected at least two addresses is not fully displayed in one line, and displaying the strings of the concurrently selected at least two addresses in the reduced font size so that each of the concurrently selected addresses is fully displayed,
   wherein when at least one of the unselected addresses is not fully displayed in one line and an excess portion of the at least one of the unselected addresses is not displayed.

2. The method of claim 1, wherein the reducing a font size is performed until the reduced font size becomes a threshold font size and when the reduced font size is the threshold font size and the selected address in the reduced font size is still not fully displayed in one line, the selected address is divided and displayed in a plurality of lines, and a maximum number of the plurality of lines is predetermined.

3. The method of claim 1, wherein the font size is predetermined.

4. The non-transitory computer-readable recording medium storing a program for implementing the method according to claim 1.

* * * * *